United States Patent [19]
Kajiwara et al.

[11] Patent Number: 5,415,216
[45] Date of Patent: May 16, 1995

[54] PASSENGER RADIAL TIRE INCLUDING BEAD REINFORCEMENT

[75] Inventors: Shinzo Kajiwara, Tsuyama; Hideaki Yoshikawa; Hideaki Sugihara, both of Kobe; Masayuki Sakamoto, Sirakawa, all of Japan

[73] Assignee: Sumitomo Rubber Industries, Ltd., Hyogo, Japan

[21] Appl. No.: 11,726

[22] Filed: Feb. 1, 1993

Related U.S. Application Data

[62] Division of Ser. No. 721,271, Jun. 26, 1991.

[30] Foreign Application Priority Data

| Jul. 5, 1990 | [JP] | Japan | 2-178526 |
| Jul. 5, 1990 | [JP] | Japan | 2-178527 |
| Jul. 5, 1990 | [JP] | Japan | 2-178528 |
| Aug. 10, 1990 | [JP] | Japan | 2-212783 |

[51] Int. Cl.⁶ .......... B60C 3/04; B60C 9/20; B60C 15/00; B60C 15/06

[52] U.S. Cl. .......... 152/536; 152/454; 152/531; 152/533; 152/539; 152/541; 152/542; 152/543; 152/546; 152/552; 152/554; 152/555

[58] Field of Search .......... 152/454, 539, 541–543, 152/546, 552, 555, 554, 533, 536, 531

[56] References Cited

U.S. PATENT DOCUMENTS

| 3,297,073 | 1/1967 | Black et al. | 152/542 |
| 3,486,547 | 12/1969 | Powers | 152/555 |
| 3,625,271 | 12/1971 | Hutch . | |
| 3,961,657 | 6/1976 | Chrobak | 152/555 |
| 4,024,901 | 5/1977 | Poque | 152/546 |
| 4,046,183 | 9/1977 | Takahashi | 152/546 |
| 4,077,455 | 3/1978 | Curtiss, Jr. et al. | 152/454 |
| 4,139,040 | 2/1979 | Samoto et al. | 152/555 |
| 4,534,393 | 8/1985 | Ippen et al. | 152/542 |
| 4,766,940 | 8/1988 | Yokoyama et al. . | |
| 4,779,659 | 10/1988 | Hanada et al. . | |
| 4,872,497 | 10/1989 | Hanada | 152/541 |
| 4,930,560 | 6/1990 | Lesti et al. | 152/546 |
| 5,048,584 | 9/1991 | Nakano et al. | 152/543 |
| 5,058,649 | 10/1991 | Hoang et al. | 152/552 |

FOREIGN PATENT DOCUMENTS

| 0339511 | 11/1989 | European Pat. Off. | 152/539 |
| 0091410 | 7/1980 | Japan | 152/542 |
| 0164506 | 12/1980 | Japan | 152/542 |
| 0157816 | 7/1987 | Japan | 152/542 |
| 0036509 | 2/1989 | Japan | 152/552 |
| 0047605 | 2/1989 | Japan | 152/539 |
| 3204314 | 9/1991 | Japan | 152/539 |
| 1139086 | 1/1969 | United Kingdom | 152/542 |
| 1592169 | 9/1990 | U.S.S.R. | 152/542 |

*Primary Examiner*—Adrienne Johnstone

[57] ABSTRACT

A passenger radial tire which comprises a tread portion, a pair of axially spaced bead portions, a pair of sidewall portions extending therebetween, a pair of bead cores disposed one in each bead portion, and a carcass extending between the bead portions and turned up around the bead cores from the axially inside to the outside thereof to form two turned up portions and one main portion therebetween, wherein in at least the sidewall portions no bead apex exists and the carcass turned up portions are located adjacently to the carcass man portion, and in each bead portion a bead reinforcement extending radially outwardly into the sidewall portion is disposed.

10 Claims, 11 Drawing Sheets

PASSENGER RADIAL TIRE INCLUDING BEAD REINFORCEMENT

This application is a divisional of application Ser. No. 07/721,271 filed on Jun. 26, 1991, the entire contents of which are hereby incorporated by reference.

The present invention relates to a pneumatic tire, more particularly a radial ply tire in which a reduction in tire weight is achieved without sacrificing steering stability.

BACKGROUND OF THE INVENTION

On recent high-performance passenger cars, a low aspect ratio tire which is excellent in steering stability, grip performance and structural durability at a high speed is widely used. In particular, for a sports car in which high speed performance is of special importance, tires with an aspect ratio less than 55% are now becoming used.

In such a low aspect ratio tire, a weight reduction is further required to achieve a further improvement in car performance, e.g. running performance, low fuel consumption and the like.

In conventional pneumatic tires, as shown in FIG. 13, each bead portion is provided with a bead apex C between a carcass main portion A and a carcass turned up portion B in order to increase the bending rigidity of the bead portion and thereby improve the steering stability of the tire. The bead apex C is made of hard rubber and extends radially outwardly from the bead core into the sidewall portion over the radially outer edge of the rim flange. Thus, the bead apex has a considerable volume and weight.

SUMMARY OF THE INVENTION

It is therefore, an object of the present invention to provide a pneumatic tire in which, by decreasing the volume of the bead apex, the tire weight is decreased but without decreasing the bead rigidity and steering stability.

According to one aspect of the present invention, a pneumatic tire comprises a tread portion, a par of axially spaced bead portions, a pair of sidewall portions extending therebetween, a pair of bead cores disposed one in each bead portion, and a carcass extending between the bead portions and turned up around the bead cores from the axially inside to the outside thereof to form two turned up portions and one main portion therebetween, wherein,
  in at least the sidewall portions no bead apex exists and the carcass turned up portions are located adjacently to the carcass main portion, and
  in each bead portion a bead reinforcement extending radially outwardly into the sidewall portion Is disposed.

BRIEF DESCRIPTION OF THE DRAWINGS

Embodiments of the present invention will now be described in detail in conjunction with the accompanying drawings, In which.

DETAILED DESCRIPTION OF THE EMBODIMENTS

Figure 1:
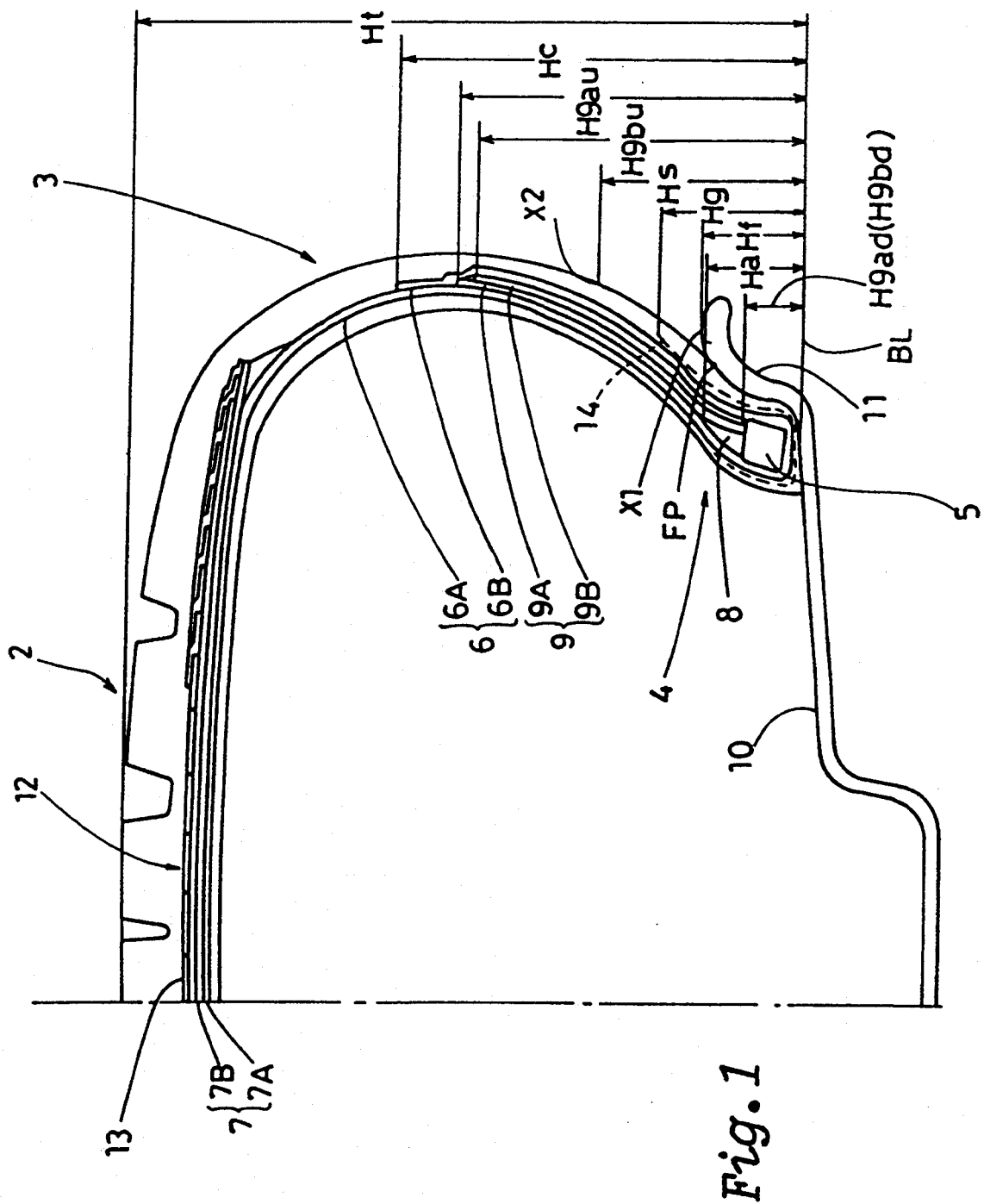
FIG. 1 is a sectional half view of a tire of the present Invention.

In the figures, each of tire 1 has a tread portion 2, a pair of axially spaced bead portions 4, and a pair of sidewall portions 3 extending between the tread edges and the bead portions, and comprises a bead core 5 disposed in each of the bead portions, a radial carcass 6 extending between the bead portions, a belt 12 disposed radially outside the carcass and inside a rubber tread, and at least one reinforcing layer 9 extending from each bead portion to the sidewall portion. In the Figures, each tire 1 is shown mounted on its regular rim 10 and inflated to its normal inner pressure.

The carcass 6 comprises at least one ply of radially arranged cords extending between the bead portions through the sidewall portions and the tread portion and turned up around the bead cores 5 from the axially inside to the outside thereof to form two turned up portion 6B and one main portion 6A therebetween.

For the carcass cords, organic fiber cords, e.g. nylon, polyester, rayon and aromatic polyamide, or metal cords, or carbon fiber cords, or the like can be used. Preferably a light weight material cord is used.

The carcass may include
  a ply which is turned up reversely around the bead cores from the axially outside to the inside thereof, and/or
  a ply which is not turned up around the bead cores.
It is however, preferable to minimize the number of carcass plies for tire weight reduction.

A reinforcing ply layer 9 is provided in each bead portion and sidewall portion and no or only a very small or short apex 8 is provided. These components provide the necessary lower sidewall stiffness in combination with the carcass turn up portion 6A and 6B.

The carcass turnup height Hc, or the radial distance of the radially outer edge of the carcass turned up portion 6B from the bead base line BL, is set to be not less than ½ the tire section height Ht defined as the radial distance from the bead base line BL to the radially outermost point on the tread face.

In FIG. 1, the tire 1 is a passenger tire having a low aspect ratio (tire section height/tire section width) of not more than 0.55 (55%). The tire size is P225/50R16, and two reinforcing layers 9A and 9B and a small size bead apex 8 are disposed in each bead portion.

The belt 12 comprises a breaker 7 and a band 13 disposed over the belt both being in the tread portion.

The small bead apex 8 is made of hard rubber having a JIS A hardness of 60 to 90 disposed radially outside the bead core 5 and between the carcass main portion 6A and the turned up portion 6B, and extending radially outwardly and tapering to provide a generally triangular cross section.

The radial height Ha of the radially outer edge of the bead apex from the bead base line BL is set to be not more than the radial height Hf of the radially outer edge X1 of a flange 11 of the regular rim 10, whereby the bead apex rubber does not extend into the region radial outward of the above-mentioned outer edge X1 of the rim flange and so the bead apex volume is greatly decreased in comparison with that in the conventional tire.

Further, the bead apex height Ha in this embodiment is less than 13% of the tire section height Ht.

The reinforcing layer 9 comprises two reinforcing layers 9A and 9B disposed between the carcass main portion 6A and the turned up portion 6B.

Each layer 9A, 9B extends at least between two heights one being the rim flange height Hf and the other being a height Hs which is 0.25 times the tire section height Ht. Thus the layers may be extended between these heights or over a greater distance. In the first embodiment the radially outer edges of the reinforcing layers 9A and 9B are extended to heights H9au and H9bu, respectively, each of which is greater than 0.25 times the tire section height Ht.

The radially inner edges of the reinforcing layers 9A and 9B extend to heights H9ad and H9bd, respectively, each of which is smaller than the height Hf of the outer edge X1 of the rim flange 11 so that the layer 9A and 9B extend over a greater distance than the minimum specified of Hf to Hs.

The radially inner edges are secured between the bead apex 8 and the carcass turned up portion 6B, and contact the radially outer face of the bead core 5. If the heights of the radially outer edges of the reinforcing layers are smaller than the minimum height Hs (=0.25 Ht), it becomes too difficult to maintain the required bead rigidity.

When the height of the radially inner edges thereof are larger than the height Hf, there is no reinforcing layer in the most deflected part of the tire when loaded, that is, the part around the outer edge of the rim flange in which the amount of deformation is very large, and as a result, the bead rigidity is greatly decreased.

More preferably, the inner edge of each reinforcing layer is located at a position radially inward of a boundary point FP which is the point where the tire side face comes into contact with the rim flange.

Further, the height H9au, H9bu of the outer edge of each reinforcing layer is smaller than the radial height Hc of the carcass turned up portion to avoid stress concentration at the outer edge and to thereby reduce the chance of rubber separation failure.

It is preferable that the outer edges of the reinforcing layers and the outer edge of the carcass turned up portion 6B are not aligned with each other. Therefore, in this embodiment, the height H9au of the axially inner reinforcing layer 9A is larger than that of the outer layer 9B.

For the cords of the reinforcing layer, aromatic polyamide fiber cords are used because of their light weight and high modulus of the same level as the steel cords.

In passenger tires, the cord thickness or construction may be 1000d/2 to 1500d/3, the twist number is 20 to 55 twist/5 cm, and the cord count is then 30 to 50/5cm.

The cords of each reinforcing layer are laid radially at an inclination angle of 15 to 75 degrees, more preferably 45 to 75 degrees, with respect to the radial direction of the tire, and the cords in each reinforcing layer cross the cords of the next layer, whereby the bead rigidity is effectively increased.

Further, the bead portion in this embodiment is provided with an additional bead reinforcing layer 14 made of organic fiber cords, preferably aromatic polyamide fiber cords. This reinforcing layer 14 is positioned around the bead cores to extend from the axially inner side to the outer side of the bead portion. The radial height Hg of the radially outer edge of the axially outward portion thereof is larger than the rim flange height Hr.

The belt 12 is composed of a breaker 7 comprising at least two crossed plies 7A and 7B disposed on the radially outside of the carcass, and a band 13 disposed radially outside the breaker.

For the breaker cords, aromatic polyamide cords are used to achieve minimum tire weight while providing the required hoop effect for the tread portion.

On the other hand, in an aromatic polyamide cord, the strength and rigidity against bending deformation is low in comparison with steel cords. As a result, road grip performance, tread wear life and noise performance are liable to be impaired, and a breaker edge failure is also liable to be caused. In order to avoid those problems, the above-mentioned band 13 is disposed radially outside the breaker 7.

Figure 2:
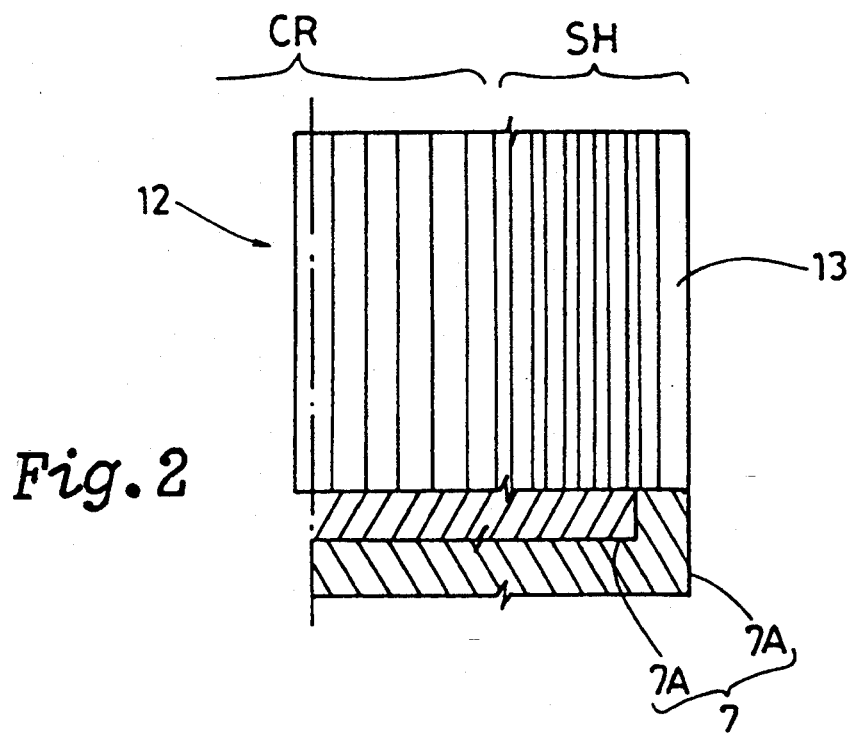
FIG. 2 is a part plan view showing of the belt of the tire in FIG. 1.

The band 13 may be, as shown In FIG. 2, formed by winding a ribbon of rubber around the breaker spirally and continuously in the circumferential direction of the tire.

In the ribbon of rubber, a nylon cord or 2 to 15 parallel nylon cords are embedded in the longitudinal direction thereof. In tread shoulder regions SH, the axially adjacent windings are overlapped with each other by about a half of the ribbon width, but not overlapped In a tread crown region CR, whereby the hoop effect of the band 13 becomes larger in the shoulder regions than the crown region, and the rigidity thereof is also increased which can compensate for lack of the rigidity of the aromatic polyamide breaker at its edge portions.

In the band 13, therefore, the or each nylon cord is laid at almost zero angle or a small angle with respect to the circumferential direction of the tire, that is, laid in parallel with the tire circumferential direction of the tire.

On the other hand, the cords of each breaker ply are laid at an inclination angle of 10 to 30 degrees with respect to the circumferential direction of the tire so as to cross the cords of the next breaker ply. Therefore, the cords of the breaker and band form a triangulated structure.

Figure 3:
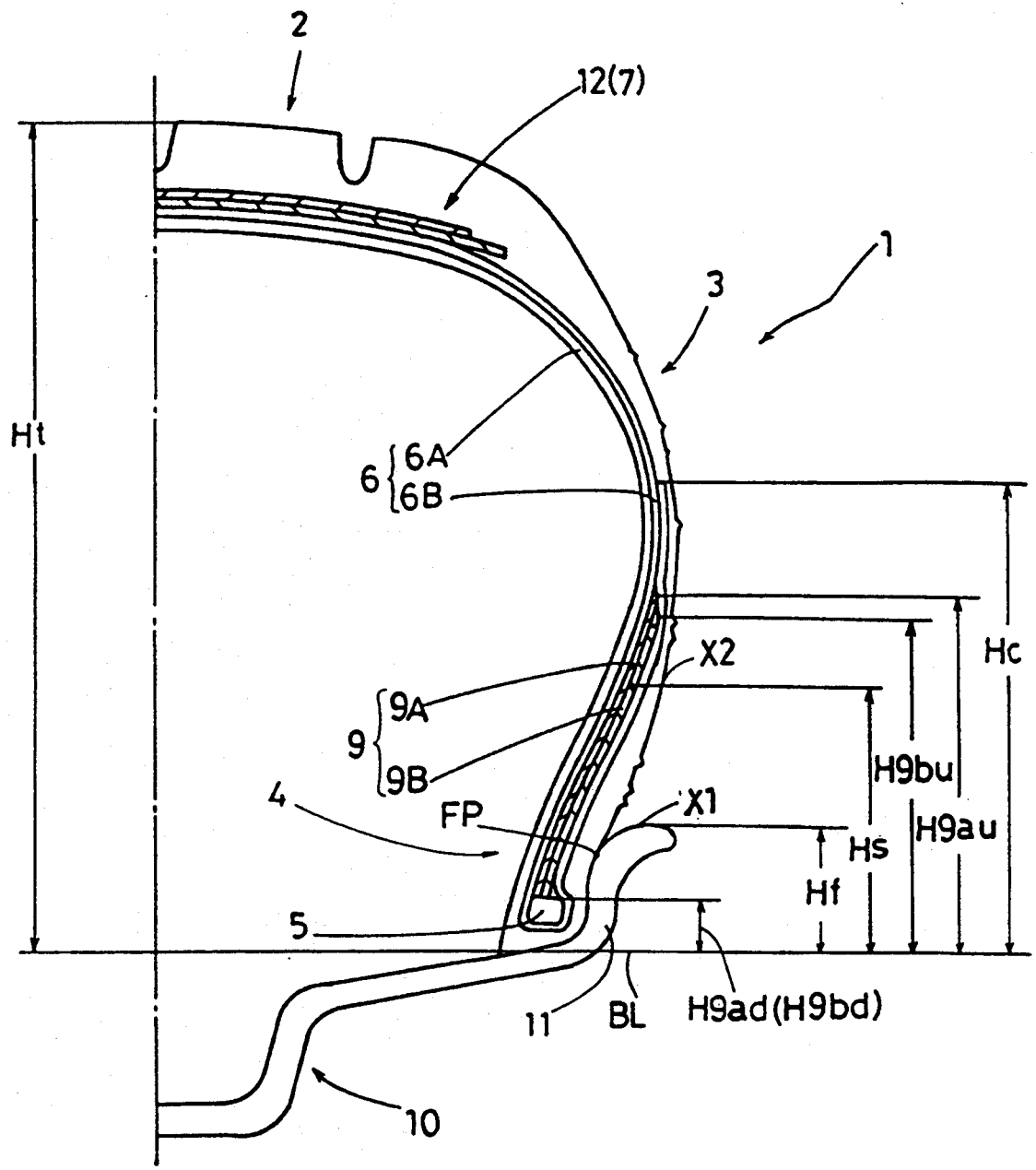
FIG. 3 is a sectional half view showing another embodiment of the present invention.

FIG. 3 shows another embodiment of the present invention, in which no bead apex at all is disposed in the bead portions 4. In this embodiment, the tire size is 185/60R14, and the carcass 6 is turned up around the bead cores 5 from the axially inside to the outside thereof.

Each turned up portion 6B thereof is bent abruptly to extend along the radially outer surface 5a of the bead core, and then extend radially outwardly along the axially outer surface of the reinforcing layer 9 and the carcass main portion 6A.

The radially inner edges of the reinforcing layers 9A and 9B are extended to the outer surface 5a of the bead core to contact thereto.

Test tires of size P225/50R16 having specifications given in Table 1 were prepared and tested for spring constant, steering stability, ride comfort and tire noise. The test results are also shown in Table 1.

In the tests, the lateral spring constant was defined as a lateral force (100 kgf) divided by the amount of deformation (mm) of the tire caused by the lateral force, when the tire was mounted on its regular rim and inflated to its regular pressure. The longitudinal spring constant was defined as a varation (100 kgf) of the longitudinal force divided by the variation of the amount of deformation (mm) of the tire when the longitudinal force is increased to 450 kgf from 350 kgf.

The steering stability, ride comfort and tire noise were evaluated in five ranks by a test driver, using a 3000 cc passenger car running at speeds between 100 km/h and 240 km/h. The larger the point, the better the result.

The tire weights of Examples 1 and 2 according to the present invention were lighter than Reference tires 1 and 2 while the other tire performance factors were improved or maintained.

Figure 4:
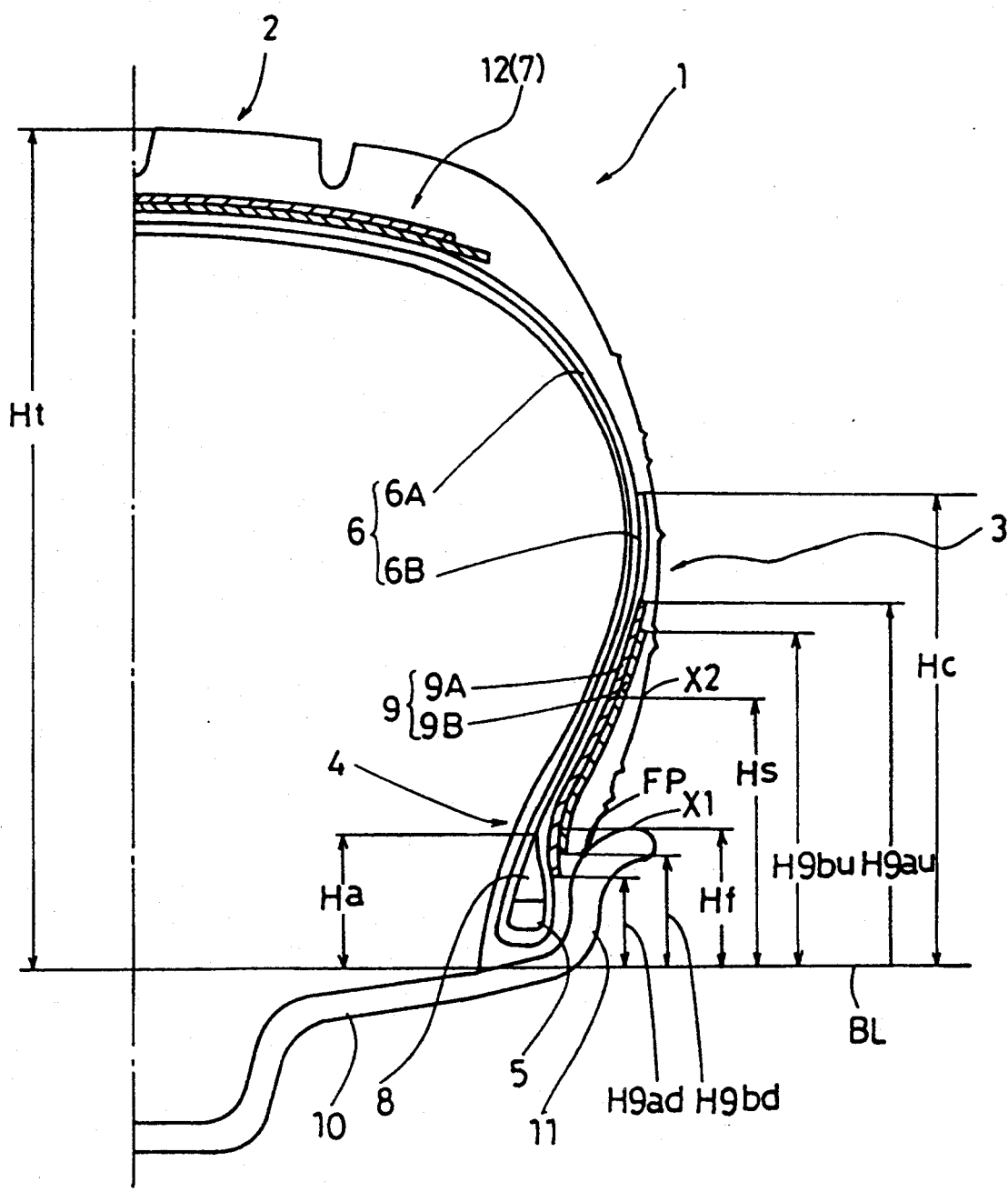
FIG. 4 is a sectional half view showing still another embodiment of the present invention.

FIG. 4 shows another embodiment of the present invention, In which two reinforcing layers 9A and 9B are disposed axially outside the carcass turned up portion 6B therealong.

In this embodiment, the tire size is 185/60R14. The radial heights H9ad and H9bd of the radially inner edges of the reinforcing layers 9A and 9B are set smaller than the height Hf of the outer edge X1 of the flange 11 of the rim 10. The radial heights H9au and H9bu of the radially outer edges of the reinforcing layers are larger than the height Hs which is 0.25 times the tire section height Ht.

Therefore, the axially outer face of the carcass turned up portion 6B is again covered between more than the height Hf and the height Hs.

Further, the heights H9au and H9bu are preferably smaller than the height Hc of the carcass turned up portion.

Between the carcass main portion 6A and each carcass turned up portion 6B, a hard rubber bead apex 8 is disposed in the same manner as the tire In FIG. 1. The height Ha of the bead apex 8 is less than the height Hf so that no bead apex rubber exists In the region radially outward of radially outer edge X1 of the rim flange 11.

The cords of each reinforcing layer are arranged generally radially at an inclination angle of 15 to 75 degrees, more preferably, 45 to 75 degrees to the radial direction of the tire so as to cross the cords of the adjacent reinforcing layer. In FIG. 4, the belt 12 comprises a breaker 7 comprising only two crossed aromatic polyamide cord plies. However, it is possible to dispose the above-mentioned band 13 radially outside thereof.

Figure 5:
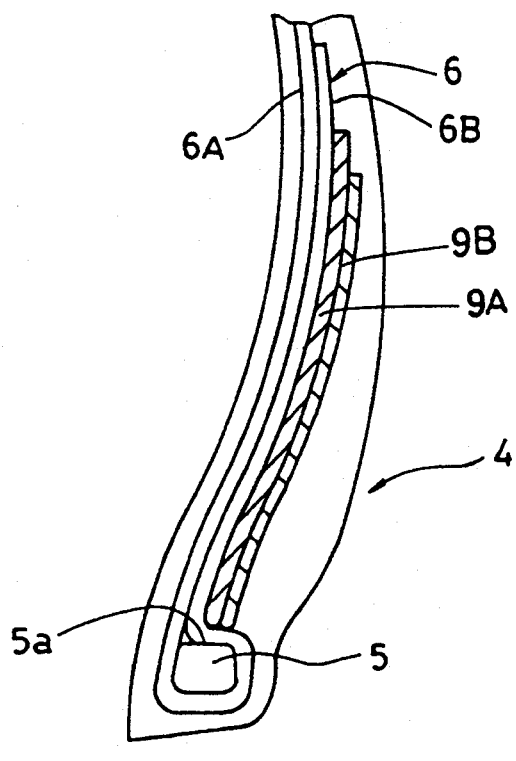
FIG. 5 is a sectional view showing a modification of the bead portion in FIG. 4.

FIG. 5 shows a modification of the bead portion of the tire in FIG. 4, wherein the bead apex 8 is completely eliminated. The carcass 6 Is turned up around the bead cores 5 from the axially inside to the outside thereof. Each turned up portion 6B is bent abruptly to contact the radially outer face 5a of the bead core 5, and then extends radially outwardly while contacting with the carcass main portion 6A. The inner edge of each reinforcing layer is extended to the bent part of the carcass turned up portion 6B to contact thereto.

Figure 6:
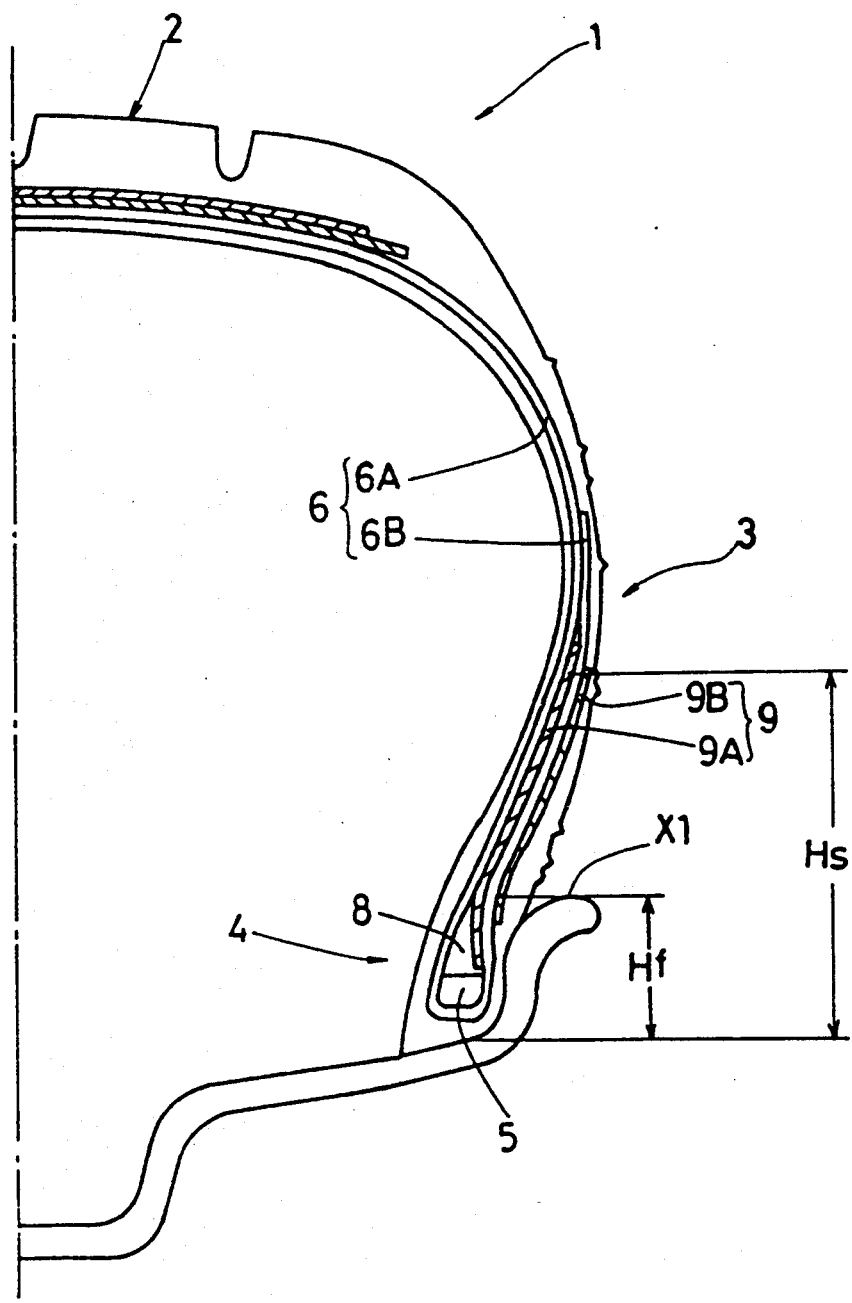
FIG. 6 Is a sectional half view showing another embodiment of the present invention.

FIG. 6 shows another embodiment of the present invention, which is very similar to or the almost same as the tire shown in FIG. 4 excepting the position of the axially inner reinforcing layer 9A.

In this embodiment, the axially inner reinforcing layer 9A is disposed between the carcass main portion 6A and each turned up portion 6B.

The radially inner edge thereof is secured between the bead apex 8 and the carcass turned up portion.

The axially outer reinforcing layer 9B is disposed axially outside the carcass turned up portion.

Figure 7:
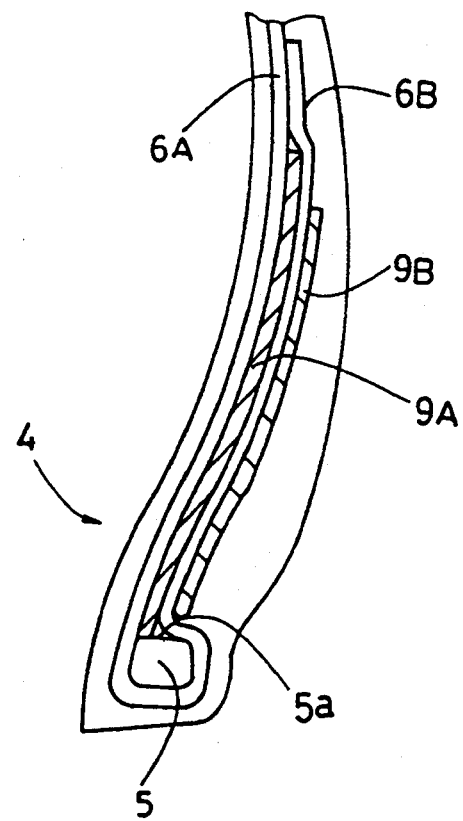
FIG. 7 is a sectional view showing a modification of the bead portion in FIG. 6.

FIG. 7 shows a modification of the bead portion of the tire in FIG. 6, wherein the bead apex 8 is completely eliminated.

Figure 8:
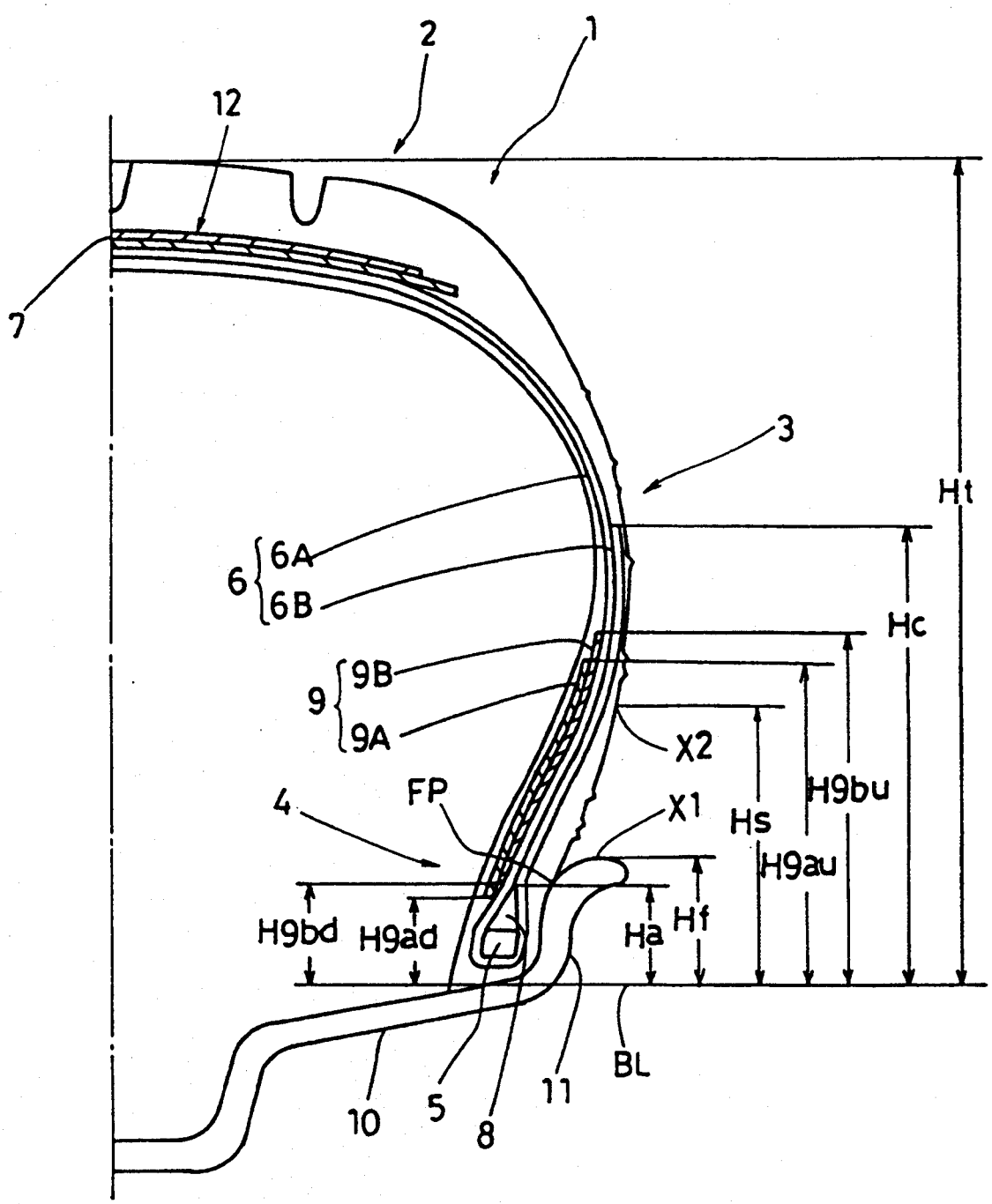
FIG. 8 is a sectional half view showing another embodiment of the present invention.

FIG. 8 shows still another embodiment of the present invention, in which two reinforcing layers 9A and 9B are disposed axially inside the carcass main portion.

In this embodiment, the radial heights H9ad and H9bd of the radially inner edges of the reinforcing layers are set smaller than the above-mentioned height Hf of the rim flange 11. The radial heights H9au and H9bu of the outer edges thereof are larger than the height Hs which is 0.25 times the tire section height Ht.

Further, the height H9ad of the axially inner layer 9A is smaller than the height H9bd of the axially outer layer 9B, and the height H9au of the axially inner layer 9A is smaller than the height H9bu of the axially outer layer 9B.

Between the carcass main portion 6A and each carcass turned up portion 6B, a hard rubber bead apex 8 is disposed in the same manner as the tire in FIG. 1. The height Ha of the bead apex 8 is smaller than the height Hf, whereby no bead apex rubber exists in the region radially outward of radially outer edge X1 of the rim flange 11.

Figure 9:
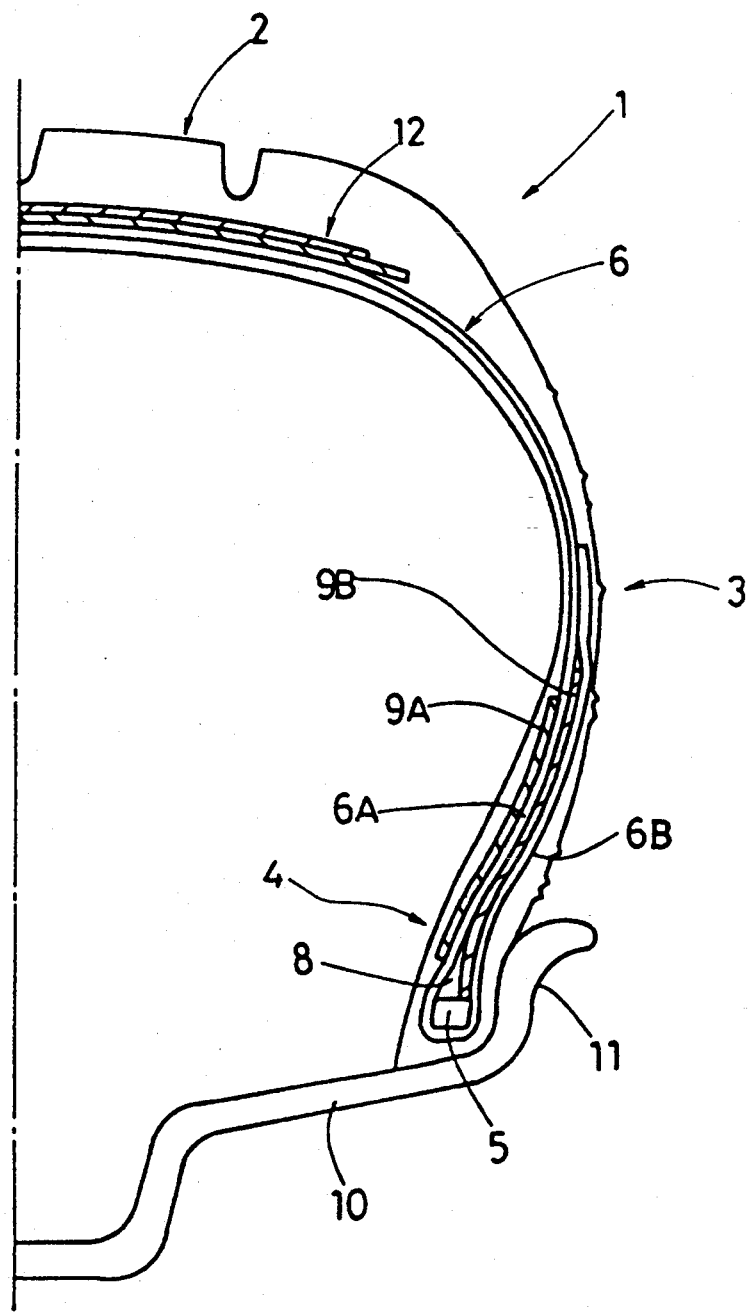
FIG. 9 is a sectional half view showing another embodiment of the present invention.

FIG. 9 shows another embodiment of the present invention, which is very similar to or almost same as the tire shown in FIG. 8 except for the position of the axially outer reinforcing layer 9B.

In this embodiment, the axially outer reinforcing layer 9B Is disposed between the carcass main portion 6A and each turned up portion 6B.

The radially inner edge thereof is secured between the bead apex 8 and the carcass turned up portion.

The axially inner reinforcing layer 9A is disposed axially inside the carcass main portion therealong.

Figure 10:
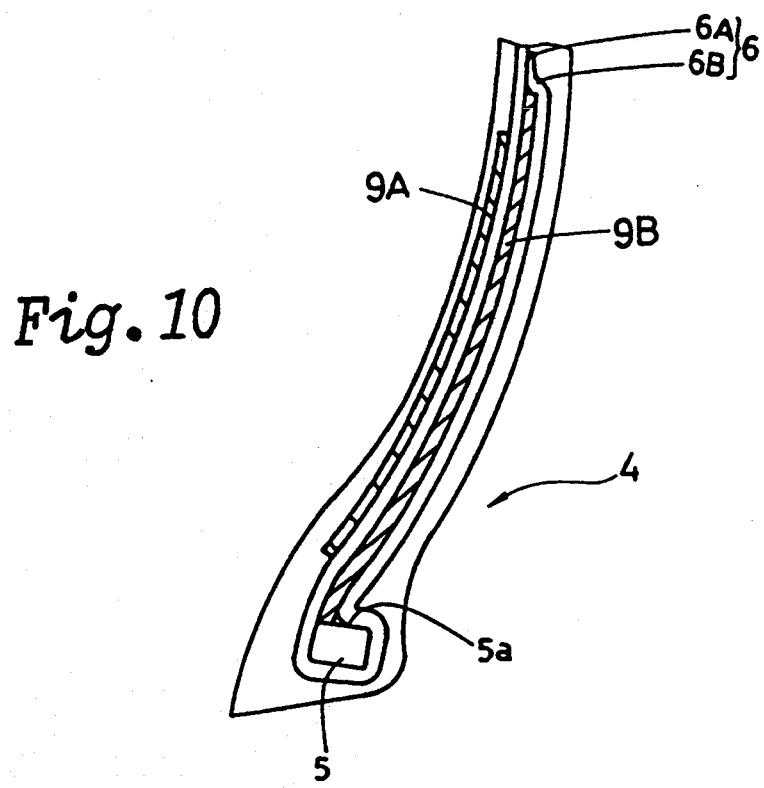
FIG. 10 is a sectional view showing a modification of the bead portion in FIG. 9.

FIG. 10 shows a modification of the bead portion of the tire in FIG. 9, wherein the bead apex 8 is completely eliminated.

The carcass 6 is turned up around the bead cores 5 from the axially inside to the outside thereof. Each turned up portion 6B is bent abruptly to contact with the radially outer face 5a of the bead core 5, and then extends radially outwardly while contacting with the axially outer surface of the reinforcing layer 9B.

The inner edge of the axially outer reinforcing layer 9B is extended to the outer face 5a of the bead core to contact thereto.

In the embodiments shown in FIGS. 3–10, for the cords of the reinforcing layers, organic fiber cords, e.g. nylon, polyester and the like, and metal cords, e.g. steel can be used. However, aromatic polyamide fiber cords having a modulus of the same level as the steel cords but a lighter weight are preferably used. When aromatic polyamide cords are used, the cord thickness and construction are 720d/2 to 3000d/2, the twist number is 20 to 70 /10cm, and the cord count is 25 to 45 /5cm.

Test tires of size 185/60R14 having the specifications given in Table 2 were prepared and tested for spring constant, lane change stability, yaw convergence, cornering G on asphalt. The test results are also shown in Table 2.

The lane change stability and yaw convergence were evaluated in five ranks by a test driver. The larger the point, the better the result. The lane change stability is the stability when a quick lane change was made during straight running at a speed of 100 km/h, and the yaw convergence is the convergence of the yaw caused by the above-mentioned quick lane change.

The cornering G on asphalt was calculated from the maximum cornering speed marked by the test vehicle during cornering on a dry asphalt road at a radius of 50 meters and the lateral force on the vehicle at the maximum cornering speed.

The weights of the Example tires according to the present invention were lighter than the Reference tires while the other tire performance factors were improved or maintained.

Figure 11:
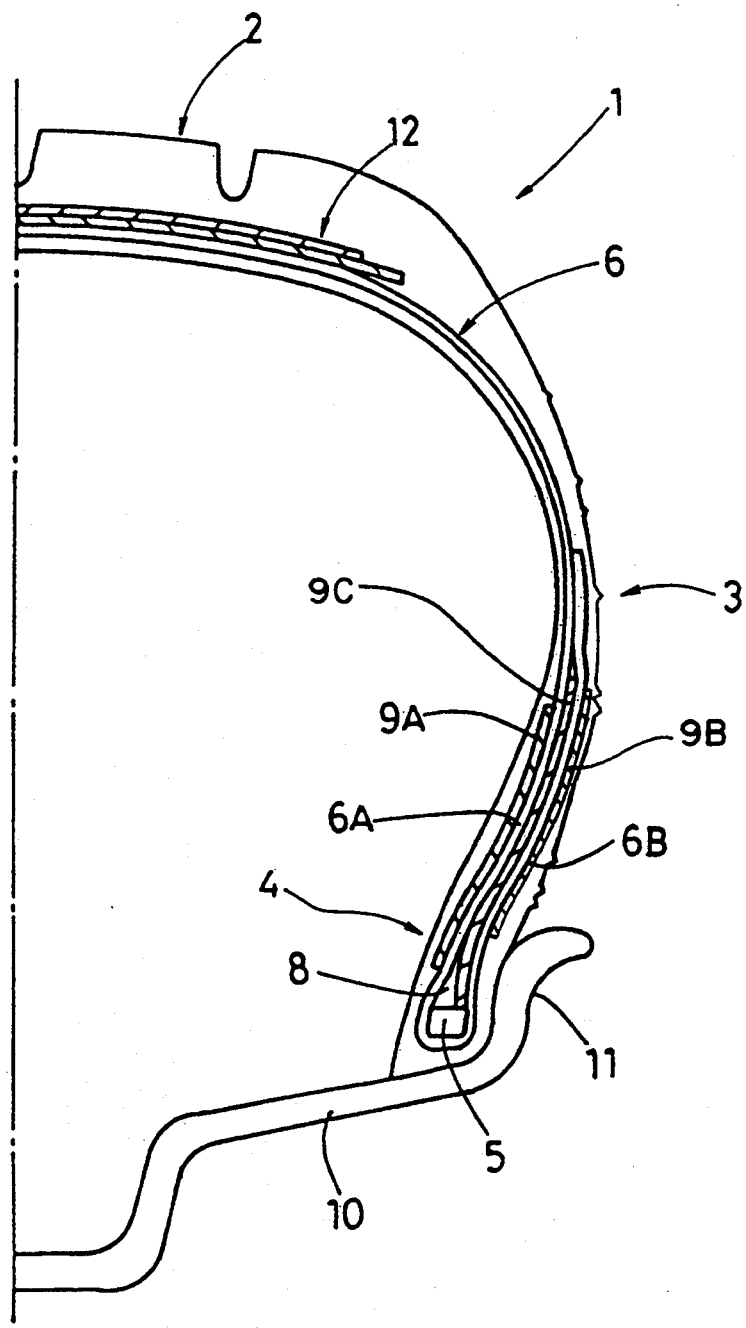
FIG. 11 is a sectional half view showing another embodiment of the present invention.
Figure 12:
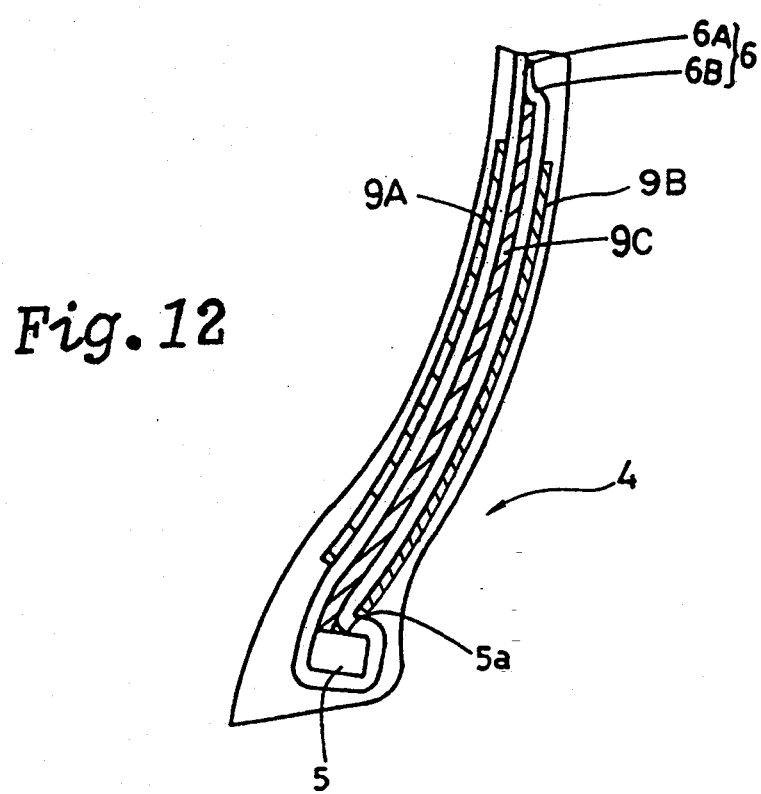
FIG. 12 is a sectional view showing a modification of the bead portion in FIG. 11.
Figure 13:
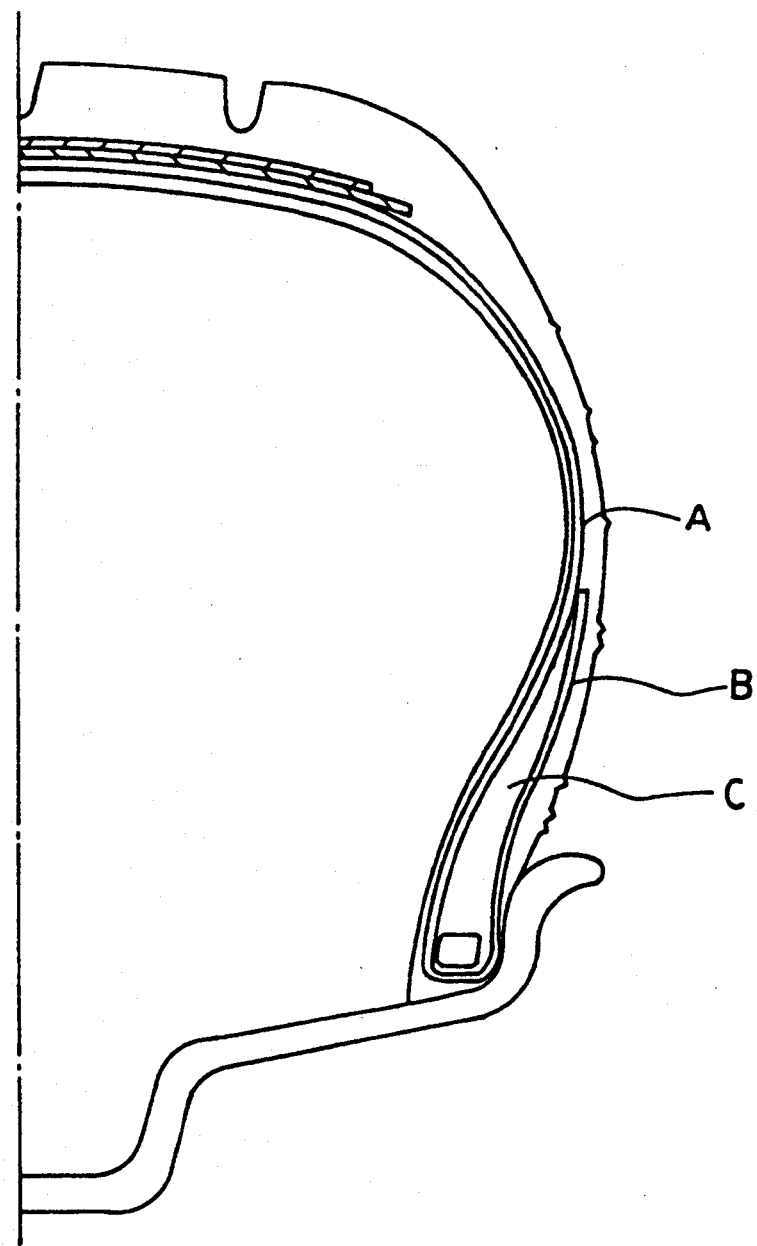
FIG. 13 is a sectional half view showing a conventional tire.

Between the adjacent plies, e.g. between the carcass main portion and the turned up portion, between the carcass ply and the reinforcing layer, a thin rubber layer (not shown) whose thickness is less than 3 mm, preferably less than 2 mm may be disposed to mitigate sharing stress between the respective layers. Further, in each bead portion, three reinforcing layers can be disposed as shown in FIG. 11 and FIG. 12 for the 185/60R14, in which the axially inner layer 9A is disposed axially inside the carcass main portion, the axially outer layer 9B is disposed axially outside the carcass turned up portion, and the middle layer 9C is disposed between the carcass main portion and the turned up portion.

As described above, in tires according to the present invention, the bead apex does not exist in the flexing sidewall regions or more specifically does not extend into the region radially outward of the radially outer edge of the rim flange. Also the reinforcing layers are provided which extend from each bead portion Into the sidewall portions. Thus the tire weight is reduced without sacrificing the steering stability, and the fuel consumption performance can be improved .

Further, when aromatic polyamide cords are used for the belt reinforcement, the tire weight can be further decreased.

TABLE 1

|  | Ex. 1 | Ex. 2 | Ref. 1 | Ref. 2 |
| --- | --- | --- | --- | --- |
| Tire size | P225/50R16 | P225/50R16 | P225/50R16 | P225/50R16 |
| Carcass | 1 ply | 1 ply | 1 ply | 1 ply |
| Cord | polyester 1500d/2 | polyester 1500d/2 | polyester 1500d/2 | polyester 1500d/2 |
| Breaker Cord | aromatic polyamide 1500d/2 | aromatic polyamide 1500d/2 | steel 1X5/0.25/35e | polyamide 1500d/2 |
| Cord angle (deg) | 20 | 20 | 24 | 20 |
| Band Cord angle (deg) | 0 | 0 | 0 | 0 |
| Reinforcing layer Cord | 2 plies aromatic polyamide 1500d/2 | 2 plies aromatic polyamide 1500d/2 | 1 ply steel | 1 ply steel |
| Ht (mm) | 114 | 114 | 114 | 114 |
| Hc (mm) | 70 | 70 | 70 | 70 |
| Hc/Ht (%) | 61.4 | 61.4 | 61.4 | 61.4 |
| H9au (mm) | 63 | 63 | 50 | 50 |
| H9bu (mm) | 58 | 58 | — | — |
| H9au/Ht | 55.2 | 55.2 | 43.8 | 43.8 |
| Ha (mm) | 12 | — | 33 | 33 |
| Ha/Ht (%) | 10.5 | — | 28.9 | 28.9 |
| Hf (mm) | 17.5 | 17.5 | 17.5 | 17.5 |
| TEST RESULTS |  |  |  |  |
| Tire weight (kg) | 10.0 | 9.8 | 10.9 | 10.5 |
| Spring constant |  |  |  |  |
| Lateral (kgf/mm) | 14.0 | 13.8 | 14.3 | 14.0 |
| Longitudinal (kgf/mm) | 22.1 | 22.0 | 22.3 | 22.1 |
| Steering stability *1 | 3 | 3 | 3 | 2.9 |
| Ride comfort *1 | 3.1 | 3.1 | 3 | 3 |
| Noise *1 | 3 | 3 | 3 | 2.9 |

*1 evaluated in five ranks, wherein the standard is 3.

TABLE 2

|  | Ex. 1 | Ex. 2 | Ex. 3 | Ex. 4 | Ex. 5 | Ex. 6 |
| --- | --- | --- | --- | --- | --- | --- |
| Tire size | 185/60R14 | 185/60R14 | 185/60R14 | 185/60R14 | 185/60R14 | 185/60R14 |
| Carcass cord | polyester | polyester | polyester | polyester | polyester | polyester |
| Bead construction | FIG. 1 | FIG. 1 | FIG. 4 | FIG. 5 | FIG. 6 | FIG. 7 |
| Reinforcing layer Cord | 2 plies aromatic polyamide | 2 plies steel | 2 plies aromatic polyamide | 2 plies aromatic polyamide | 2 plies aromatic polyamide | 2 plies aromatic polyamide |
| Cord angle (deg) *1 | +30 & −30 | +30 & −30 | +30 & −30 | +30 & −30 | +30 & −30 | +30 & −30 |
| Ht (mm) | 110 | 110 | 110 | 110 | 110 | 110 |
| Hc (mm) | 65 | 65 | 65 | 65 | 65 | 65 |
| Hc/Ht (%) | 59 | 59 | 59 | 59 | 59 | 59 |
| H9au (mm) | 55 | 50 | 55 | 55 | 55 | 55 |
| H9bu (mm) | 50 | 45 | 50 | 50 | 50 | 50 |

TABLE 2-continued

|  | | | | | |
| --- | --- | --- | --- | --- | --- |
| H9au/Ht (%) | 50 | 45 | 50 | 50 | 50 | 50 |
| Ha (mm) | 16 | 16 | 16 | — | 16 | — |
| Hf (mm) | 18 | 18 | 18 | 18 | 18 | 18 |
| TEST RESULTS | | | | | | |
| Tire weight *2 | 96 | 98 | 96 | 95 | 96 | 95 |
| Lateral spring constant *2 | 99 | 103 | 98 | 97 | 100 | 99 |
| Cornering asphalt G *2 | 98 | 104 | 99 | 98 | 101 | 99 |
| Lane change stability *3 | 3.0 | 3.5 | 3.0 | 2.9 | 3.1 | 3.0 |
| Yaw convergence *3 | 3.0 | 3.5 | 3.0 | 2.9 | 3.1 | 3.0 |

|  | Ex. 7 | Ex. 8 | Ex. 9 | Ex. 10 | Ref. |
| --- | --- | --- | --- | --- | --- |
| Tire size | 185/60R14 | 185/60R14 | 185/60R14 | 185/60R14 | 185/60R14 |
| Carcass cord | polyester | polyester | polyester | polyester | polyester |
| Bead construction | FIG. 8 | ÷ FIG. 8 | FIG. 9 | FIG. 10 | FIG. 11 |
| Reinforcing layer | 2 plies | 2 plies | 2 plies | 2 plies | |
| Cord | aromatic polyamide | aromatic polyamide | aromatic polyamide | aromatic polyamide | — |
| Cord angle (deg) *1 | +30 & −30 | +30 & −30 | +30 & −30 | +30 & −30 | — |
| Ht (mm) | 110 | 110 | 110 | 110 | 110 |
| Hc (mm) | 65 | 65 | 65 | 65 | 65 |
| Hc/Ht (%) | 59 | 59 | 59 | 59 | 59 |
| H9au (mm) | 50 | 50 | 50 | 50 | — |
| H9bu (mm) | 55 | 55 | 55 | 55 | — |
| H9au/Ht (%) | 45 | 45 | 45 | 45 | — |
| Ha (mm) | 16 | — | 16 | — | 42 |
| Hf (mm) | 18 | 18 | 18 | 18 | 18 |
| TEST RESULTS | | | | | |
| Tire weight *2 | 96 | 95 | 96 | 95 | 100 |
| Lateral spring constant *2 | 104 | 99 | 102 | 98 | 100 |
| Cornering asphalt G *2 | 102 | 100 | 102 | 99 | 100 |
| Lane change stability *3 | 3.3 | 3.0 | 3.1 | 3.0 | 3.0 |
| Yaw convergence *3 | 3.3 | 3.0 | 3.1 | 3.0 | 3.0 |

*1 The angles of the axially inner layer & outer layer with respect to the radial direction.
*2 The results are indicated by an index based on the assumption that Ref. = 100. In Tire weight, the smaller index is better. In Lateral spring constant and Cornering asphalt G, the larger index is better.
*3 evaluated in five ranks, wherein the standard is 3.

We claim:

1. A tire and rim combination comprising a pneumatic tire and a rim having a flange with a radially outer edge, said pneumatic tire comprising
   a tread portion,
   a pair of axially spaced bead portions,
   a pair of sidewall portions extending between said tread portion and one of said bead portions,
   a pair of bead cores, one of said pair of bead cores being disposed in each said bead portion, and
   a carcass consisting of a ply extending between said bead portions and turned up around the bead cores from the axially inside to the outside thereof to form two turned up portions and one main portion therebetween,
   each said bead portion not provided between said main portion and said turned up portion with a bead apex made of hard rubber, but provided with a middle reinforcing layer made of aromatic polyamide fiber cords,
   each said bead portion further provided with an axially outer reinforcing layer made of aromatic polyamide fiber cords disposed axially outward of said turned up portion,
   each of the middle and outer reinforcing layers extending radially outwardly from said bead portion into the sidewall portion,
   in a region radially outward of the bead core, each of said two turned up portions is located adjacently to said main portion,
   each of the middle and outer reinforcing layers extending at least between a first radial height corresponding to that of the radially outer edge of said flange and a second radial height being 25% of the tire section height each being measured from the bead base line so that, in the region therebetween, the middle reinforcing layer is located adjacently to both the main portion and the turned up portion, and the outer reinforcing layer is located adjacently to said turned up portion,
   each said turned up portion having a radially outer edge located at a radial height of not less than 50% of the tire section height, each being measured from the bead base line,
   the middle reinforcing layer having a radially outer edge located radially inward of said radially outer edge of said turned up portion,
   the axially outer reinforcing layer having a radially outer edge located radially inward of said radially outer edge of said turned up portion,
   the aromatic fiber cords of each of the middle and outer reinforcing layers are laid radially at an inclination angle of 15 to 75 degrees with respect to the radial direction of the tire so that the cords of the middle reinforcing layer cross the cords of the outer reinforcing layer.

2. A tire and rim combination comprising a pneumatic tire and a rim having a flange with a radially outer edge, said pneumatic tire comprising
   a tread portion,
   a pair of axially spaced bead portions,
   a pair of sidewall portions extending between said tread portion and one of said bead portions,
   a pair of bead cores, one of said pair of bead cores being disposed in each said bead portion, and
   a carcass consisting of a ply extending between said bead portions and turned up around the bead cores from the axially inside to the outside thereof to form two turned up portions and one main portion therebetween,
   each said bead portion not provided between said main portion and said turned up portion with a bead apex made of hard rubber, but provided with a middle reinforcing layer made of aromatic polyamide fiber cords, each said bead portion further provided with an axially inner reinforcing layer made of aromatic polyamide fiber cords disposed axially inward of said main portion, each of the middle and inner reinforcing layers extending radially outwardly from said bead portion into the sidewall portion, in a region radially outward of the bead core, each of said two turned up portions is located adjacently to said main portion, each of the middle and inner reinforcing layers extending at least between a first radial height corresponding to that of the radially outer edge of said flange and a second radial height being 25% of the tire section height each being measured from the bead base line so that, in the region therebetween, the middle reinforcing layer is located adjacently to both said main portion and said turned up portion, and the inner reinforcing layer located adjacently to said main portion, each said turned up portion having a radially outer edge located at a radial height of not less than 50% of the tire section height, each being measured from the bead base line, the middle reinforcing layer having a radially outer edge located radially inward of said radially outer edge of said turned up portion, the axially inner reinforcing layer having a radially outer edge located radially inward of said radially outer edge of said turned up portion, the aromatic fiber cords of each of the middle and inner reinforcing layers are laid radially at an inclination angle of 15 to 75 degrees with respect to the radial direction of the tire so that the cords of the middle reinforcing layer cross the cords of the inner reinforcing layer.

3. A tire and rim combination comprising a pneumatic tire and a rim having a flange with a radially outer edge, said pneumatic tire comprising a tread portion, a pair of axially spaced bead portions, a pair of sidewall portions extending between said tread portion and one of said bead portions, a pair of bead cores, one of said pair of bead cores being disposed in each said bead portion, and a carcass consisting of a ply extending between said bead portions and turned up around the bead cores form the axially inside to the outside thereof to form two turned up portions and one main portion therebetween, each said bead portion not provided between said main portion and turned up portion with a bead apex made of hard rubber, but provided with a middle reinforcing layer made of aromatic polyamide fiber cords, each said bead portion further provided with an axially outer reinforcing layer made of aromatic polyamide fiber cords disposed axially outward of said turned up portion, and an axially inner reinforcing layer made of aromatic polyamide fiber cords disposed axially inward of said main portion, each of the middle, outer and inner reinforcing layers extending radially outwardly from said bead portion into the sidewall portion, in a region radially outward of said bead core, each of said two turned up portions is located adjacently to said main portion, each of the middle, outer and inner reinforcing layers extending at least between a first radial height corresponding to that of the radially outer edge of said flange and a second radial height being 25% of the tire section height, each being measured from the bead base line so that, in the region therebetween, the middle reinforcing layer is located adjacently to both said main portion and said turned up portion, the outer reinforcing layer located adjacently to said turned up portion, and the inner reinforcing layer located adjacently to said main portion, each said turned up portion having a radially outer edge located at a radial height of not less than 50% of the tire section height, each being measured from the bead base line, the middle reinforcing layer having a radially outer edge located radially inward of said radially outer edge of said turned up portion, the axially outer reinforcing layer having a radially outer edge located radially inward of said radially outer edge of said turned up portion, the axially inner reinforcing layer having a radially outer edge located radially inward of said radially outer edge of said turned up portion, the aromatic fiber cords of each of the middle, outer and inner reinforcing layers are laid radially at an inclination angle of 15 to 75 degrees with respect to the radial direction of the tire so that the cords of the middle reinforcing layer cross the cords of the outer reinforcing layer, and the cords of the middle reinforcing layer cross the cords of the inner reinforcing layer.

4. The combination according to claim 1, 2, or 3, wherein the tread portion is provided with a belt comprising an aromatic polyamide cord breaker disposed radially outside the carcass and a nylon cord band disposed radially outside the breaker.

5. The combination according to claim 1, 2 or 3, wherein said middle reinforcing layer has a radially inner edge located adjacently to the radially outside of the bead core.

6. The combination according to claim 1, 2, or 3, wherein each of said turnup portions extends along a radially outer surface of one of the pair of bead cores.

7. The combination according to claim 1, wherein said axially outer reinforcing layer has a radially inner edge located between said radially outer edge of the flange and the bead core in the radial direction of the tire.

8. The combination according to claim 2, wherein said axially inner reinforcing layer has a radially inner edge located between said radially outer edge of the flange and the bead core in the radial direction of the tire.

9. The combination according to claim 3, wherein said axially outer reinforcing layer has a radially inner edge located between said radially outer edge of the flange and the bead core in the radial direction of the tire.

10. The combination according to claim 3, wherein said axially inner reinforcing layer has a radially inner edge located between said radially outer edge of the flange and the bead core in the radial direction of the tire.

* * * * *